United States Patent [19]

Masumoto et al.

[11] Patent Number: 5,397,490
[45] Date of Patent: Mar. 14, 1995

[54] MAGNETIC MATERIAL

[75] Inventors: Tsuyoshi Masumoto, 3-8-22, Kamisugi, Aoba-ku; Akihisa Inoue, 11-806, Kawauchijutaku, Mubanchi, Kawauchi, Aoba-ku, both of Sendai-shi, Miyagi; Junichi Nagahora, Yokohama, all of Japan

[73] Assignees: Tsuyoshi Masumoto; Akihisa Inoue; Yoshida Kogyo K.K., all of Japan

[21] Appl. No.: 96,275

[22] Filed: Jul. 26, 1993

[30] Foreign Application Priority Data

Aug. 3, 1992 [JP] Japan ................................ 4-206626

[51] Int. Cl.⁶ ............................................ H01F 1/147
[52] U.S. Cl. ............................. 252/62.55; 148/105; 148/300; 420/528; 420/529
[58] Field of Search ........................... 420/528, 529; 252/62.55; 148/105, 300

[56] References Cited

FOREIGN PATENT DOCUMENTS

74111  11/1968  Germany ............................ 420/528
38-1202  2/1963  Japan .................................. 420/529
58-130244  8/1983  Japan .................................. 420/529

*Primary Examiner*—Jack Cooper
*Attorney, Agent, or Firm*—Finnegan, Henderson, Farabow, Garrett & Dunner

[57] ABSTRACT

A magnetic material consisting essentially of Al and 10 to 50 at. % of at least one capable of alloying with Al to form quasicrystals (for example, 5 to 25 at. % of at least one member selected between Cu and Pd and 5 to 35 at. % of Mn) and up to 25 at. % of at least one element having a smaller atomic radius than those of the above elements (for example, B). The magnetic material is produced by adding, to a mixture consisting of Al and at least one element capable of alloying with Al to form quasicrystals and including at least one transition metal, at least one element having a smaller atomic radius than those of Al and the above elements to dissolve the element having a smaller atomic radius in a solid solution form in a quasicrystalline phase. The thus obtained magnetic crystal is useful in various applications, such as magnetic recording heads, and a process for producing the same.

4 Claims, 13 Drawing Sheets

FIG. 13

MAGNETIC MATERIAL

BACKGROUND OF THE INVENTION

1. Field of the Invention

The present invention relates to a magnetic material consisting essentially of a quasicrystalline phase and applicable to various applications, such as magnetic recording heads, and a process for producing the same.

2. Description of the Prior Art

In an Al—Mn-based alloy, since the discovery of a novel alloy having a crystalline structure with a five- or tenfold symmetry, the so-called "quasicrystal", many studies have been made on the quasicrystalline alloy as a novel material for the purpose of determining the composition of the material, structural analysis and elucidation of fundamental physical properties. Among the quasicrystalline alloys, an Al40%—Cu10%—Mn2-5%—Ge25% (at. %) alloy has been found to have a relatively high coercive force (see A. P. Tsai et al., Jpn. Appl. Phys., 27 <1988>L2252). Further, it has been reported that an AlMnSi-based alloy has a ferromagnetism (see R. A. Dunlap et al., Phys. Rev. B., 39 <1989>, 4808).

The intensity of magnetization of the above-described alloys is so low even at room temperature that, in order to put these alloys to practical use as a magnetic material, it is necessary to improve the intensity of magnetization. Accordingly, an object of the present invention is to improve the magnetic properties of Al-based quasicrystalline alloys.

SUMMARY OF THE INVENTION

A first aspect of the present invention is directed to a magnetic material consisting essentially of a quasicrystalline phase consisting of Al and 10 to 50 at. % of at least one element capable of alloying with Al to form quasicrystals and including at least one transition element and up to 25 at. % of at least one element having a smaller atomic radius than those of Al and the foregoing elements. A further aspect of the present invention provides a process for producing the above-described magnetic material, which comprises adding, to a mixture consisting of Al and at least one element capable of alloying with Al to form quasicrystals and including at least one transition metal, at least one element having a smaller atomic radius than those of the aforesaid elements to dissolve the element having a smaller atomic radius in a solid solution form in a quasicrystalline phase. A representative embodiment of this process is a process for producing the above-specified magnetic material which comprises adding up to 25 at. % of at least one element having a smaller atomic radius so as to provide a final composition consisting of 5 to 25 at. % of at least one member selected between Cu and Pd and 5 to 35 at. % of Mn with the balance consisting of Al and impurities and subjecting the mixture to rapid solidification, thereby regulating the intensity of magnetization.

DETAILED DESCRIPTION OF THE PREFERRED EMBODIMENTS

Examples of aluminum alloys which exhibit the formation of quasicrystals through rapidly solidification include Al-noble metal element-transition metal element alloys. The term "noble metal element" used herein is intended to mean at least one element selected from among Ni, Cu, Pd, Ag, Pt and Au, and the term "transition metal element" used herein is intended to mean at least one element selected from among V, Cr, Mn, Fe, Co, Nb, Mo, Tc, Ru, Rh, Ta, W, Re, Os and Ir. For example, the study of the dependency of the lattice parameter of the I phase of an Al—Pd—Mn-based alloy and magnetization upon the composition has revealed that, as the quasicrystalline phase becomes close to a crystalline structure of the CsCl type, the lattice parameter of the I phase simply decreases and the intensity of magnetization increases. The magnetism of an alloy comprising Al as a nonferromagnetic metal and Mn dilutely dissolved therein in a solid solution form may be thought to be developed by magnetic exchange interaction between Mn atoms themselves [governed by the RKKY (Ruderman-Kittell-Kasuya-Yoshida) effect]. Since the behavior of spin glass is observed in the Al—Pd—Mn-based quasicrystal, the RKKY interaction in the quasicrystal may be thought as acting on the quasicrystal cluster level.

Therefore, it is conceivable that when an element having a remarkably different atomic radius and capable of applying a large local strain is added to a quasicrystal, the resultant change in the lattice parameter of the quasicrystalline phase affects the interaction between Mn atoms themselves in the quasicrystal cluster, which favorably affects the RKKY interaction capable of generating magnetism, which in turn is useful for regulating the magnetism.

The present invention has been made based on the above-described idea. Specifically, when at least one element (element X) having a smaller atomic radius is dissolved in a solid solution form in quasicrystals, the lattice parameter of the quasicrystals [icosahedral phase (I phase) or I phase plus regular decagonal phase (D phase)] decreases and the lattice strain increases with an increasing concentration of the element X, which contributes to a remarkable improvement in the magnetization. The term "element X" used herein is intended to mean at least one element selected from among those having a smaller atomic radius than those of Al and other additive elements. Examples of such an element which may be used in an Al—Pd—Mn-based alloy include B and P.

The quasicrystalline phase of the material according to the present invention consists of a single phase of the I phase or a mixture of the I and D phases depending upon the composition of the alloy. These quasicrystalline phases are converted into a stable crystalline state when they are heat-treated at a certain temperature or higher temperatures. Characteristic phenomena observed herein are that when the quasicrystalline phase consists of a single I phase, an intense magnetization is exhibited and, at the same time, it has a maximum value. Specifically, it is the quasicrystalline phase consisting of the single I phase that exhibits an intense magnetization, and, when the D phase is contained in this quasicrystalline phase, the magnetization property is still on a high level although it is somewhat deteriorated. The change from the quasicrystalline state to a crystalline state causes the magnetization capability to be lost. Further, as is apparent from the following detailed description, the magnetism developed in the material of the present invention is ferrimagnetism.

In the present invention, examples of the elements capable of alloying with Al to form quasicrystals include noble metal elements and transition metal elements. The element X serves to decrease the lattice parameter of the quasicrystalline phases and increases the lattice strain to exhibit a positive effect on the magnetic interaction between transition metal atoms, which gives rise to the effect of improving the intensity of magnetization. The proportions of the noble metal element, transition metal element and element X are preferably 5 to 25 at. %, 5 to 35 at. % and up to 25 at. %, respectively. When the composition is outside the above-described range, it becomes difficult to form quasicrystals, so that the resultant alloy consists of a single D phase or a mixed phase of quasicrystals and crystalline phases or a crystalline single phase and the intensity of magnetization is remarkably lowered.

The material of the present invention can be produced by using a melt quenching apparatus well known in the art, such as a melt spinning apparatus. It is also possible to produce the material by other known production processes which exhibit a quenching effect of about $10^2$ K/sec or more, such as gas atomization and sputtering. Further, the material of the present invention can be produced also by a crystallization treatment, such as heating of an amorphous phase or a supersaturated solid solution produced by rapid solidification.

Fundamentally, since the quasicrystal does not have a deformation zone (slip plane or slip band), such as slip, it has a high strength, a high hardness, a high resistance to deformation and abrasion and further a light weight derived from the Al-base alloy, that is, it has excellent properties and applicability as a structural material. That is, the present invention can provide not only a novel substance as a magnetic material but also a composite functional material excellent also in the mechanical properties.

EXAMPLE 1

Given amounts of raw materials of Al and Mn each having a purity of 99.999 wt. %, Pd having a purity of 99.99 wt. % and B having a purity of 99.9 wt. %, were weighed out, and a homogeneous master alloy was produced therefrom in an arc melting furnace in an Ar atmosphere. A ribbon material having a size of 0.02 mm in thickness and 1 mm in width was produced from this mother alloy by using a single-roller liquid quenching apparatus (a melt spinning apparatus). In this case, the quenching roll was a copper roll with a diameter of 200 mm, and the number of revolutions of the roll was 2000 rpm. The crystalline states of the quasicrystal samples in the as-rapidly-solidified state and the samples after heat-treated at various temperatures were examined by X-ray diffractometry, a transmission electron microscope (TEM) and an optical microscope. The intensity of magnetization was measured in a magnetic field of 1.59 MA/m (20 kOe) at a temperature in the range of from 77 to 900K with a vibrating sample magnetometer (VSM). For comparison, data were given on comparative materials wherein Si, Ge, Sb or Bi was added instead of B.

Figure 1:
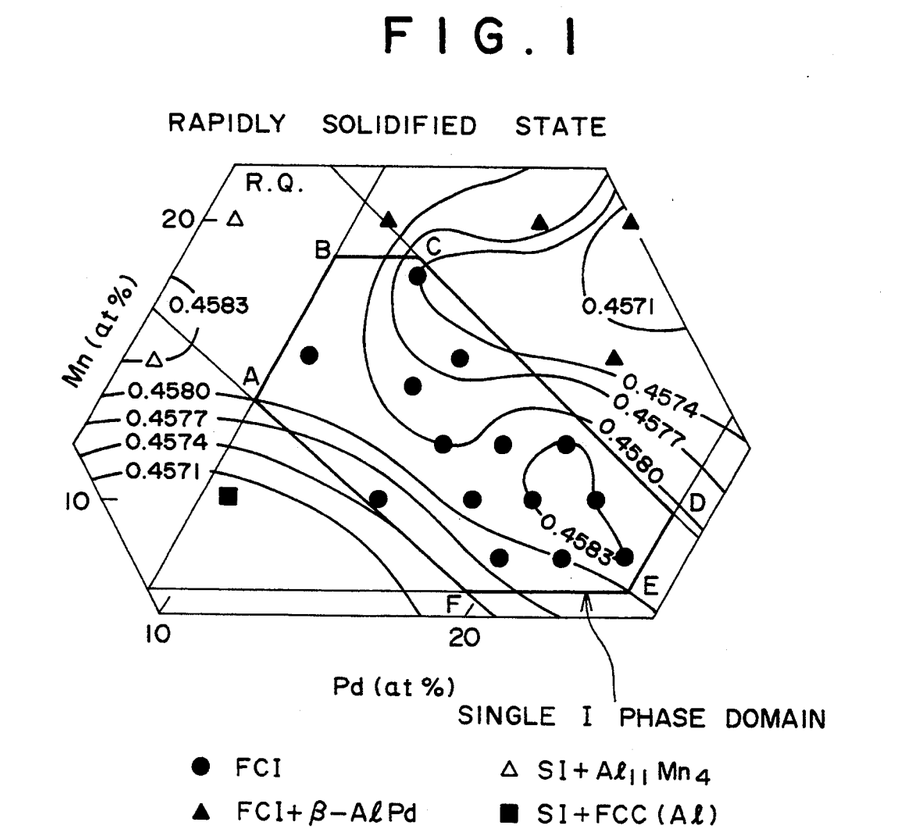
FIG. 1 is a diagram showing the range of composition capable of forming an I phase of an Al—Pd—Mn-base alloy in the as-rapidly-solidified state and the dependency of the lattice parameter of the I phase upon the composition.

The range of composition capable of forming the I phase of an Al—Pd—Mn alloy in the as-rapidly-solidified state for use as a reference and the composition dependency of the lattice parameter of the I phase are shown in FIG. I The lattice parameter was determined from a reflection peak of Elser's index (211111) by using X-ray diffraction data. In the drawing, the range of the composition capable of forming a single I phase domain is defined as a portion surrounded by lines formed by connection point A ($Al_{78}Pd_9Mn_{13}$), point B ($Al_{72}Pd_9Mn_{19}$), point C ($Al_{69}Pd_{12}Mn_{19}$), point D ($Al_{65}Pd_{25}Mn_{10}$), point E ($Al_{68}Pd_{25}Mn_7$) and point F ($Al_{74}Pd_{19}Mn_7$) successively. In this composition range, the Pd content is in the range of from 9 to 25 at. %, and the Mn content is in the range of from 7 to 19 at. %. The lattice parameter of the I phase is distributed in the range of from 0.4574 to 0.4583 nm, and no significant variation in the lattice parameter is observed in the single I phase domain. When the stoichiometric composition of the I phase is assumed to be $Al_{70}Pd_{20}Mn_{10}$, the range of composition capable of forming the Single I phase is distributed on the lower concentration sides for Pd and the higher concentration side for Mn.

Although the composition of $A_{60}Pd_{20}Mn_{20}$ is ferromagnetic at room temperature, it does not consists of a single I phase as can be estimated from FIG. 1. However, the I phase in the vicinity (Mn-rich) of this composition has an atomic arrangement suitable for the development of ferromagnetism, and it is expected that the I phase having a small lattice parameter will have a possibility of the development of ferromagnetism. When the fact that the magnetization of a quasicrystal is attributable to the RKKY interaction is taken into consideration, as is apparent from FIG. 1, a change in the lattice parameter caused by the change in the composition in this range is as small as 1%. In the change to this extent alone, no large effect can be expected on the magnetic interaction acting on the scale of cluster. The addition of a different element capable of introducing a larger lattice strain is thought to be useful for effective action on the RKKY interaction.

Figure 2A:
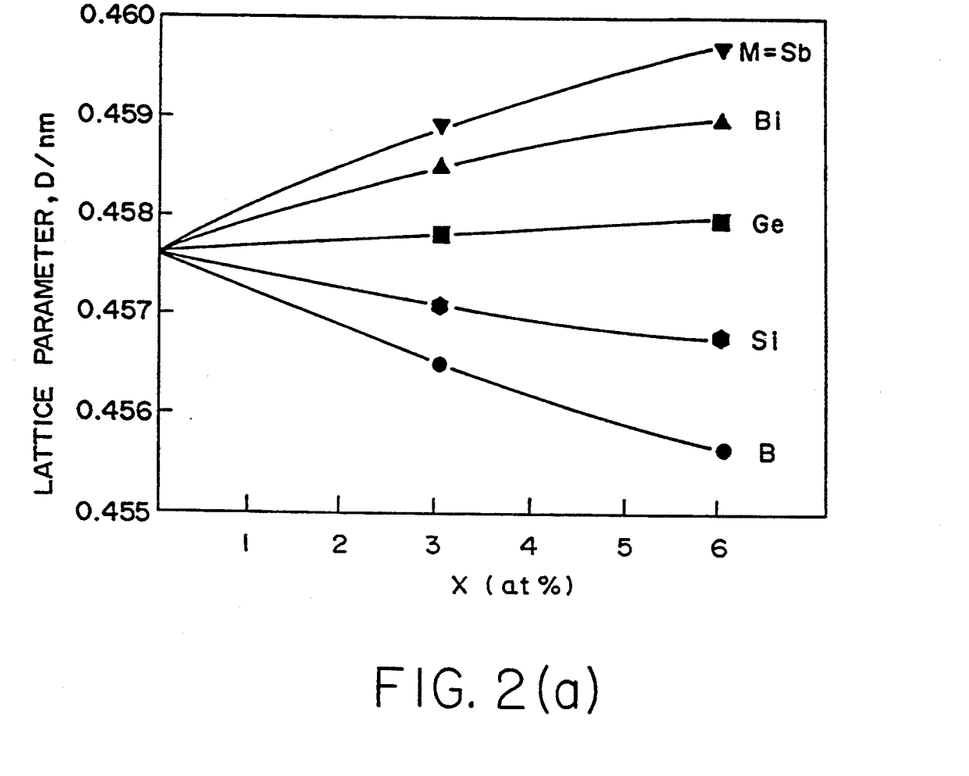
FIG. 2 is a diagram showing the relationship between the concentration of M and the changes in the lattice parameter and magnetization.
Figure 2B:
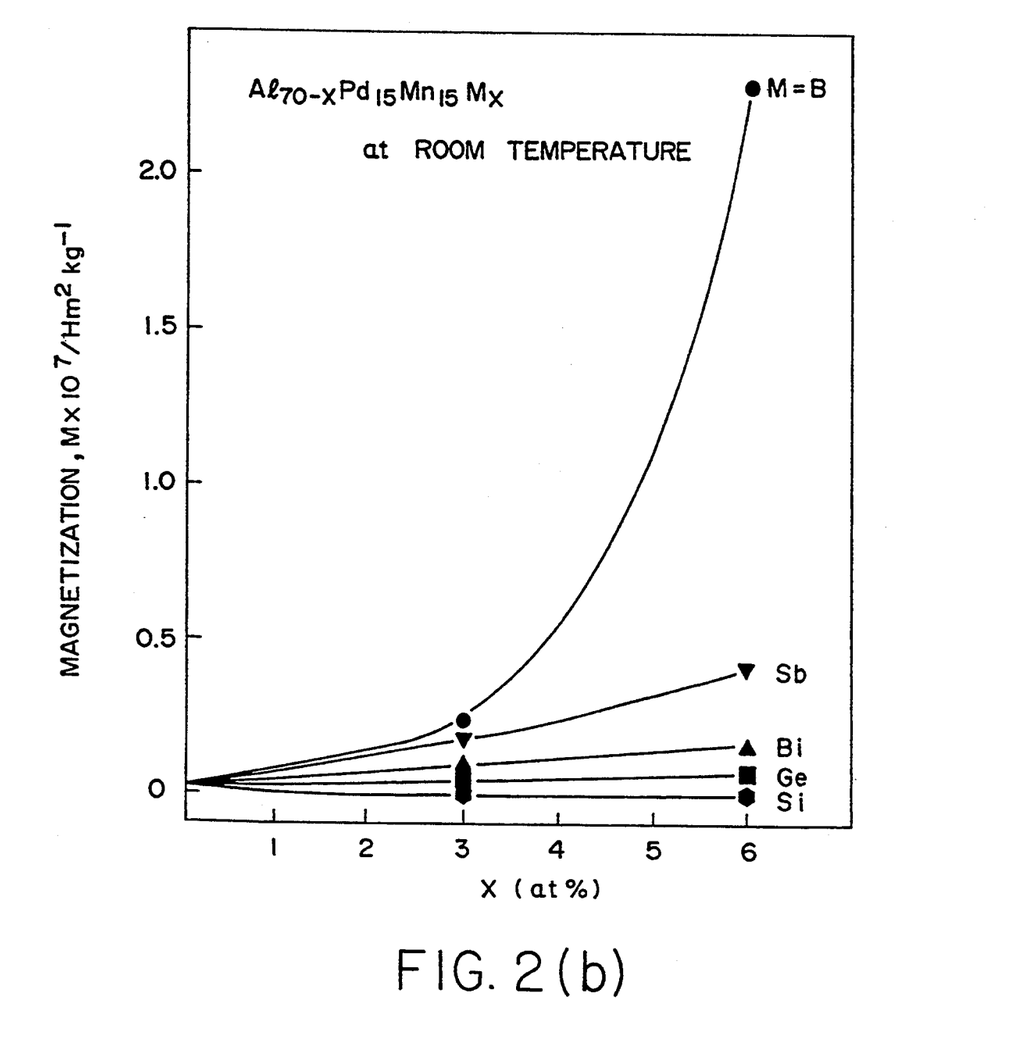

FIG. 2 is a graph showing the change of the lattice parameter and the change of the magnetization in a magnetic field of 20 kOe at room temperature as a function of the concentration of M on a rapidly solidified $Al_{70-x}Pd_{15}Mn_{15}M_x$ (M: B, Si, Ge, Sb or Bi) alloy. A reduction in the lattice parameter is significant in the order of B>Si. By contrast, for other elements, an increase in the lattice parameter is significant in the order of Sb>Bi>Ge. There is a tendency that the magnetization will increase in proportion to the magnitude of the deviation from the lattice parameter with no additional elements (B, Sb, etc.). This is most significant in B.

Figure 3:
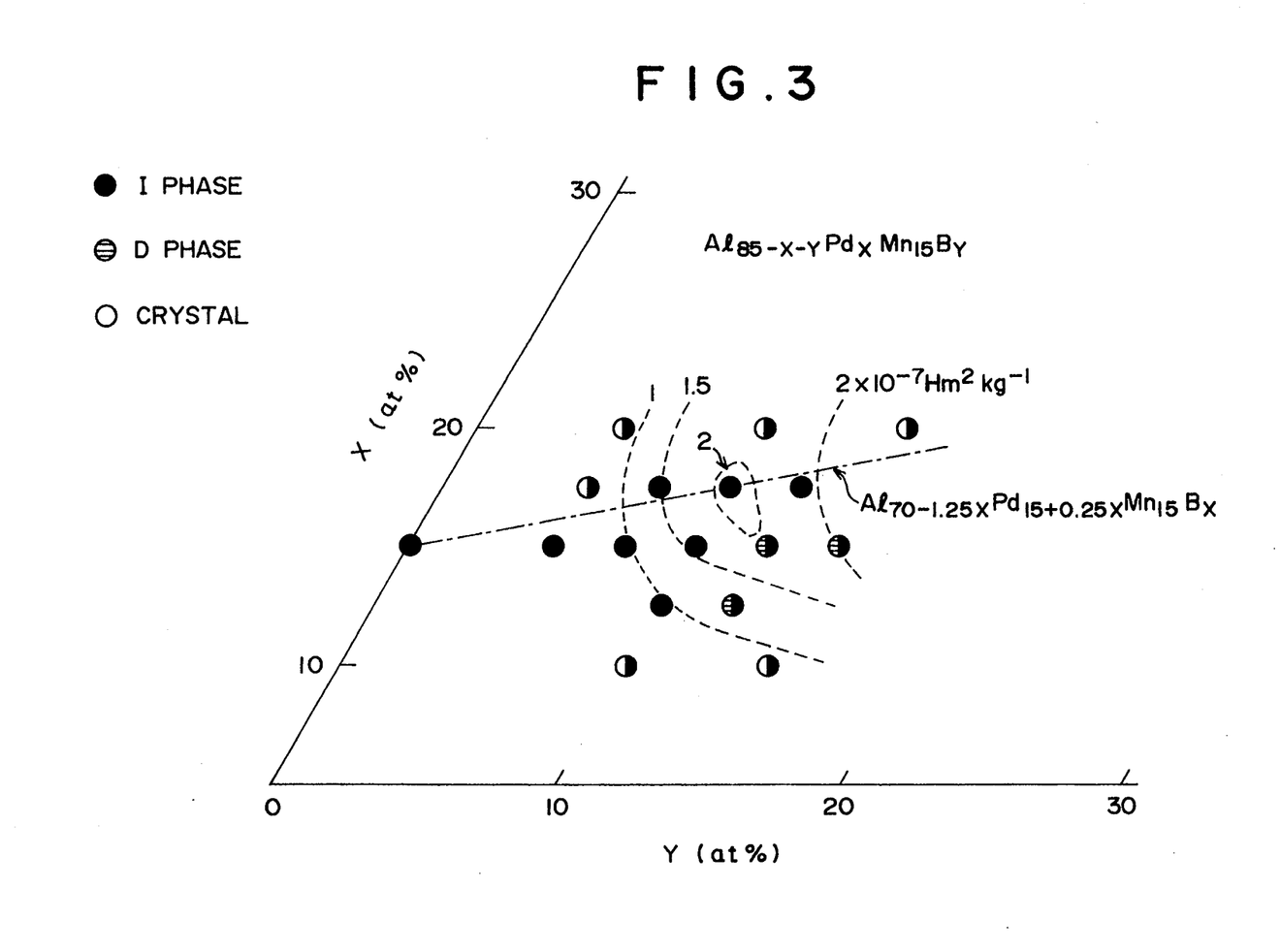
FIG. 3 is a graph showing the relationship between the concentration of B and the changes in the lattice parameter and magnetization.
Figure 4:
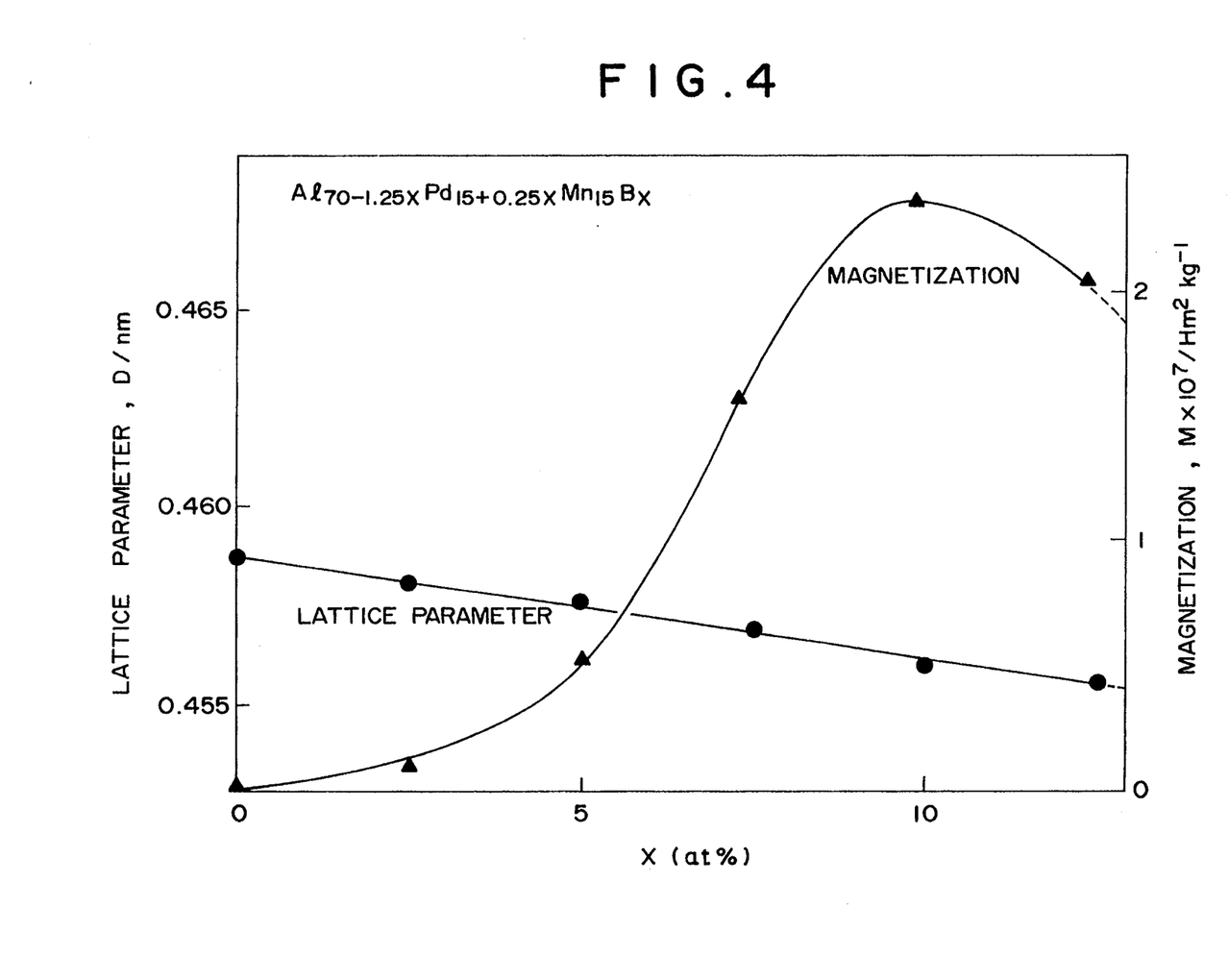
FIG. 4 is a graph showing the relationship between the concentration of B and the changes in the lattice parameter and magnetization.

FIGS. 3 and 4 are graphs showing the change in the lattice parameter and the change in the magnetization measured in a magnetic field of 20 kOe as a function of the concentration of B on a four-component alloy of $Al_{70-x}Pd_{15}Mn_{15}B_x$ for the purpose of examining the effect of B in detail based on the results shown in FIG. 2. The lattice parameter linearly decreases with an increasing concentration of B, which satisfies the Vegard's rule. On the other hand, the magnetization greatly increase with an increasing concentration of B. The magnetization becomes maximum, i.e. $2.3 \times 10^{-7}$ $Hm^2/kg$, when the concentration of B of the single I phase is 10 at. %, and then rapidly decreases with a further increase in the concentration of B.

The observation of the texture and structure under a TEM has revealed that these alloys comprise crystal grains having a size of 200 to 300 nm and no second phase is observed in the grain boundary. Further, according to selected area electron diffraction, they have two-, three- and fivefold symmetries. These facts suggest that the alloys consist of a single I phase.

Figure 5:
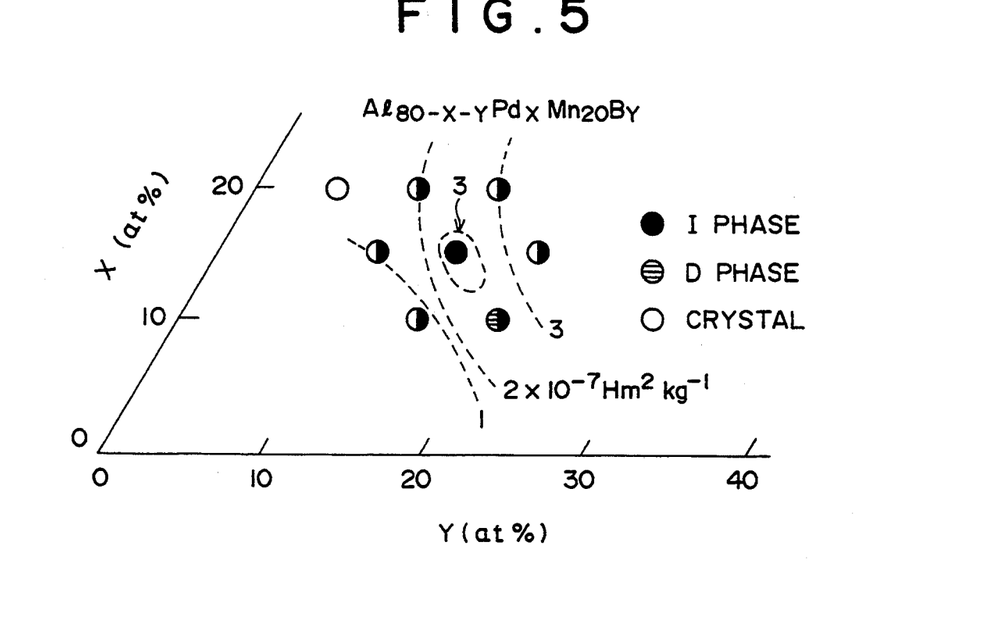
FIG. 5 is a graph showing the compositional dependency of the intensity of magnetization with the concentration of Mn being fixed to 20 at. %.
Figure 6:
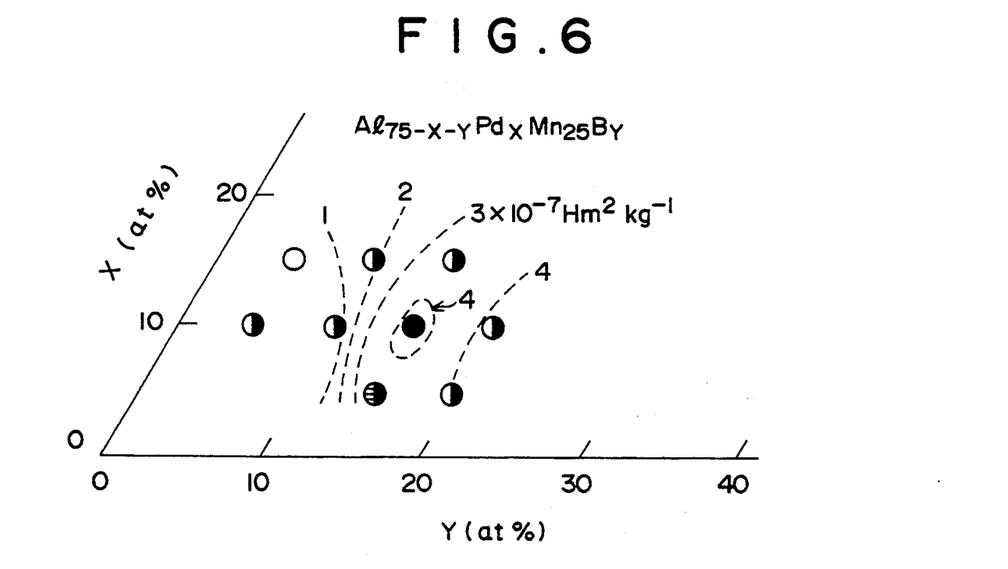
FIG. 6 is a graph showing the compositional dependency of the intensity of magnetization with the concentration of Mn being fixed to 25 at. %.
Figure 7:
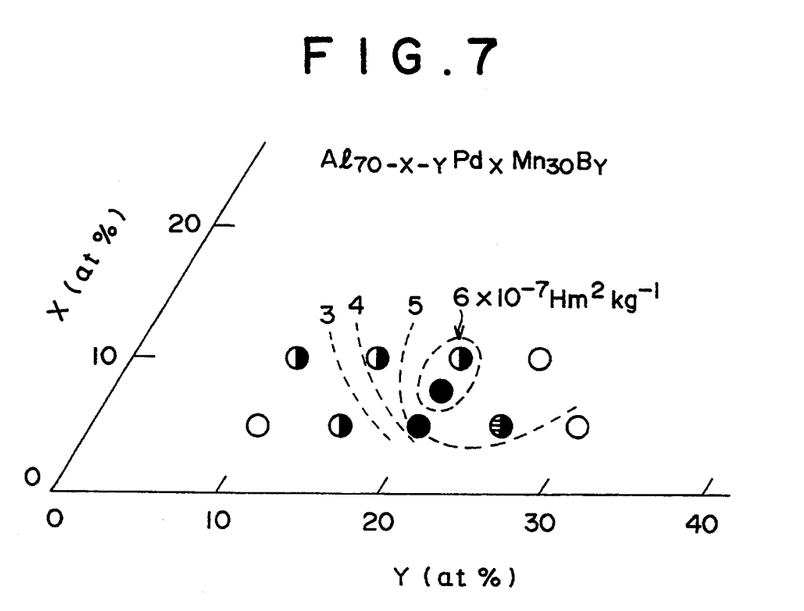
FIG. 7 is a graph showing the composition dependency of the intensity of magnetization with the concentration of Mn being fixed to 30 at. %.

FIGS. 5, 6 and 7 are graphs showing the results of determination of the compositional dependency of the I phase and I+D phase formation domains in an Al—Pd—Mn—B alloy when the concentrations of Pd and B are varied with that of Mn being fixed to 20 at. %, 25 at. % and 30 at. %, respectively. As is apparent from the drawings, when the concentration of Mn is 20, 25 or 30 at. %, the maximum value of the magnetization is observed in the single I phase domain, which demonstrates that the Mn atom in the I phase is in a state suitable for the development of magnetization. The maximum value of the magnetization of the quasicrystalline phase formed by rapid solidification is 42 emu/g (3.3 kA/m) for $Al_{42.5}Pd_{7.5}Mn_{30}B_{20}$ alloy consisting of a single I phase.

Figure 8:
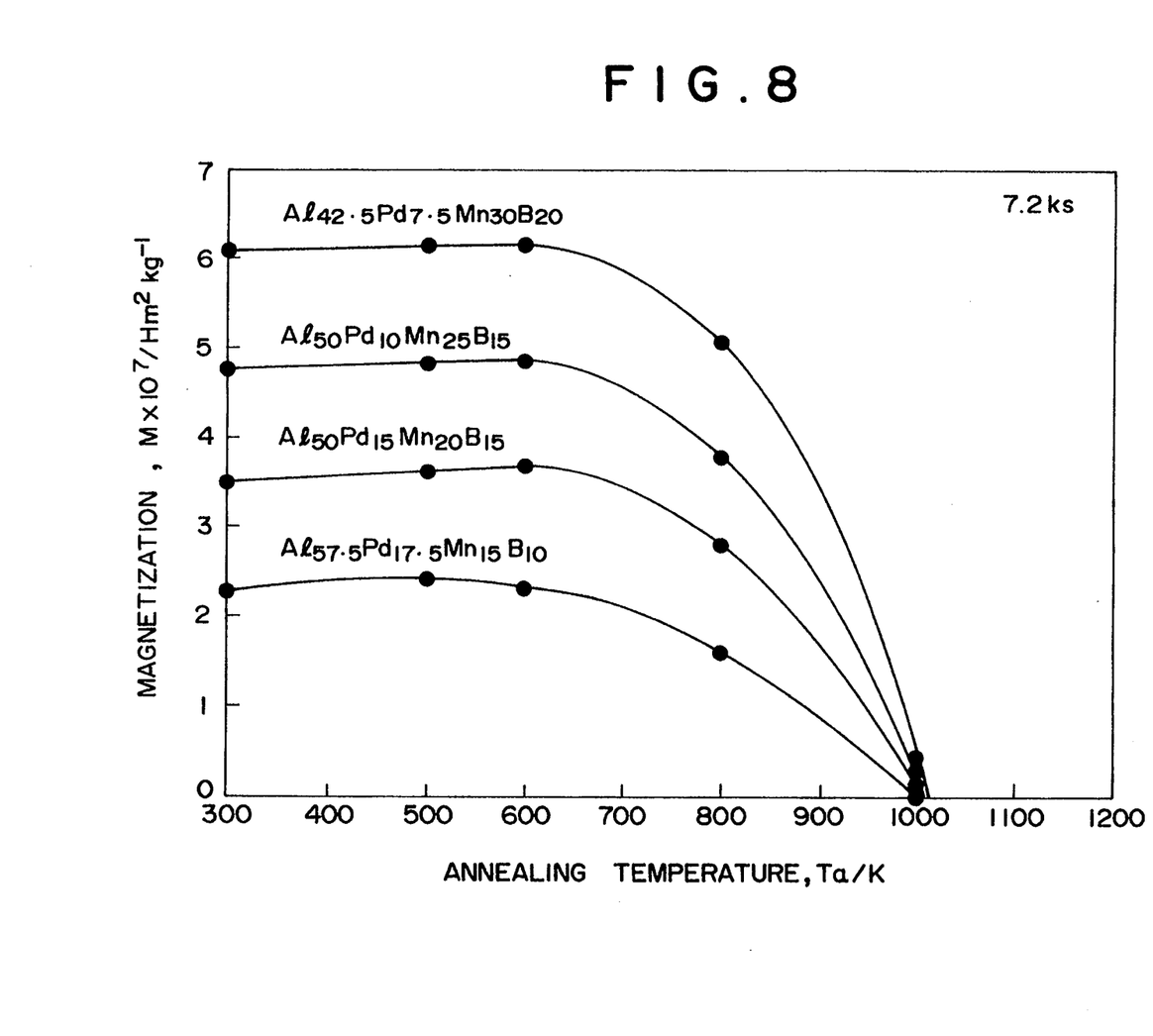
FIG. 8 is a graph showing the effect of the annealing temperature on the magnetization.

FIG. 8 is a graph showing the effect of the annealing temperature on the magnetization in four compositions indicated in the drawing on an Al—Pd—Mn—B quasicrystal. As is apparent from the drawing, in all the alloys, the magnetization does not vary at an annealing temperature up to 600 K., decreases by heating at a temperature of 600 K. or above and becomes substantially zero at a temperature of 1020 K.

Figure 9:
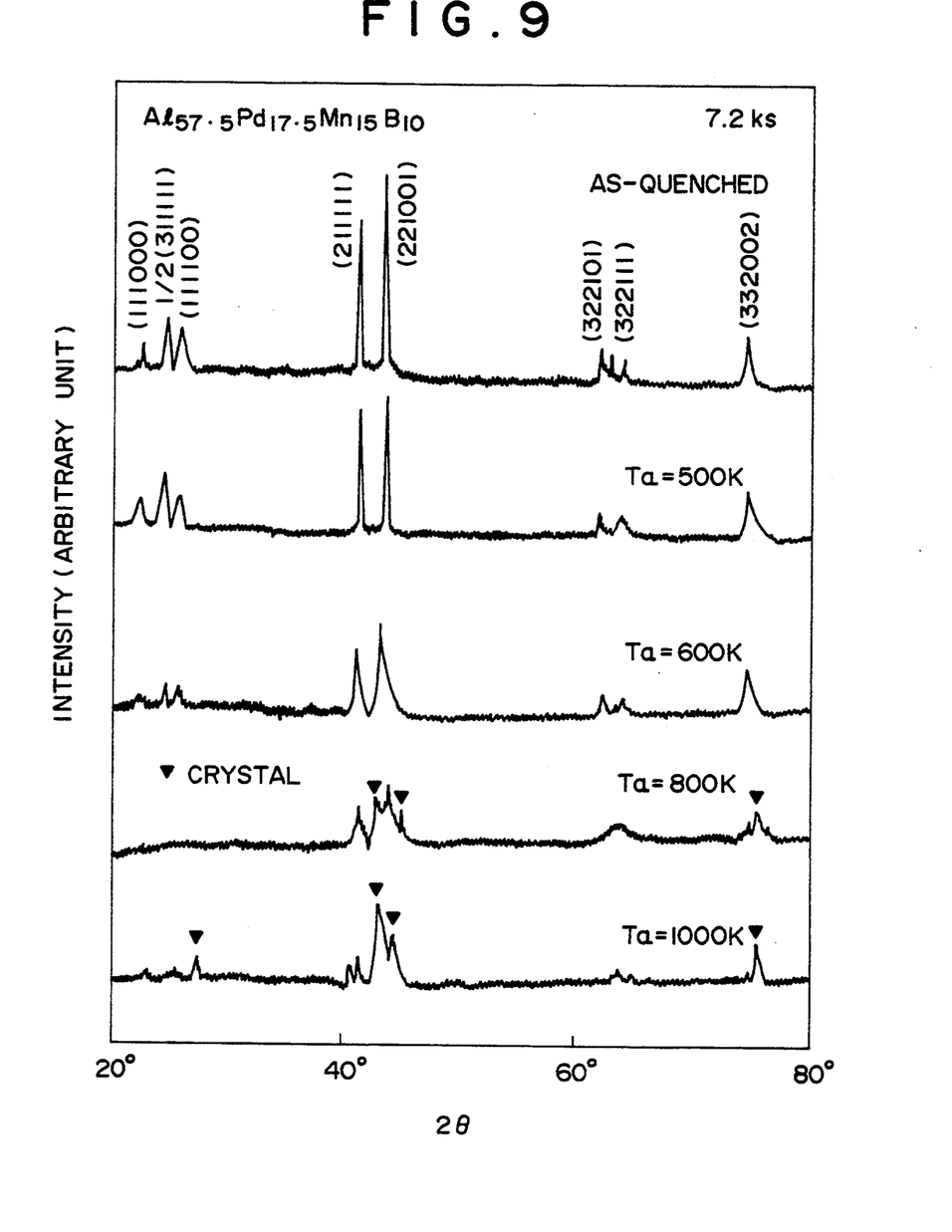
FIG. 9 is a graph showing the influence of the annealing temperature on the change of texture.

FIG. 9 in a graph showing the results of examination of the effect of the annealing temperature on the change in the texture of an $Al_{57.5}Pd_{17.5}Mn_{15}B_{10}$ alloy by X-ray diffractometry. The texture of the quasicrystal alone is observed when the temperature is up to 500 K., and the intensity of the peak of the quasicrystal slightly decreases at a temperature of 600 K. with the half-value width being increased. When the annealing temperature is further raised, the peak of a crystal begins to appear, and crystallization completes at 1000 K. When FIG. 9 is compared with FIG. 8, it becomes apparent that the magnetization decreases with the advance of the crystallization and the completion of crystallization causes the magnetization to be lost. In other words, the occurrence of magnetization is attributable to the atomic arrangement of the quasicrystal (I phase).

Figure 10:
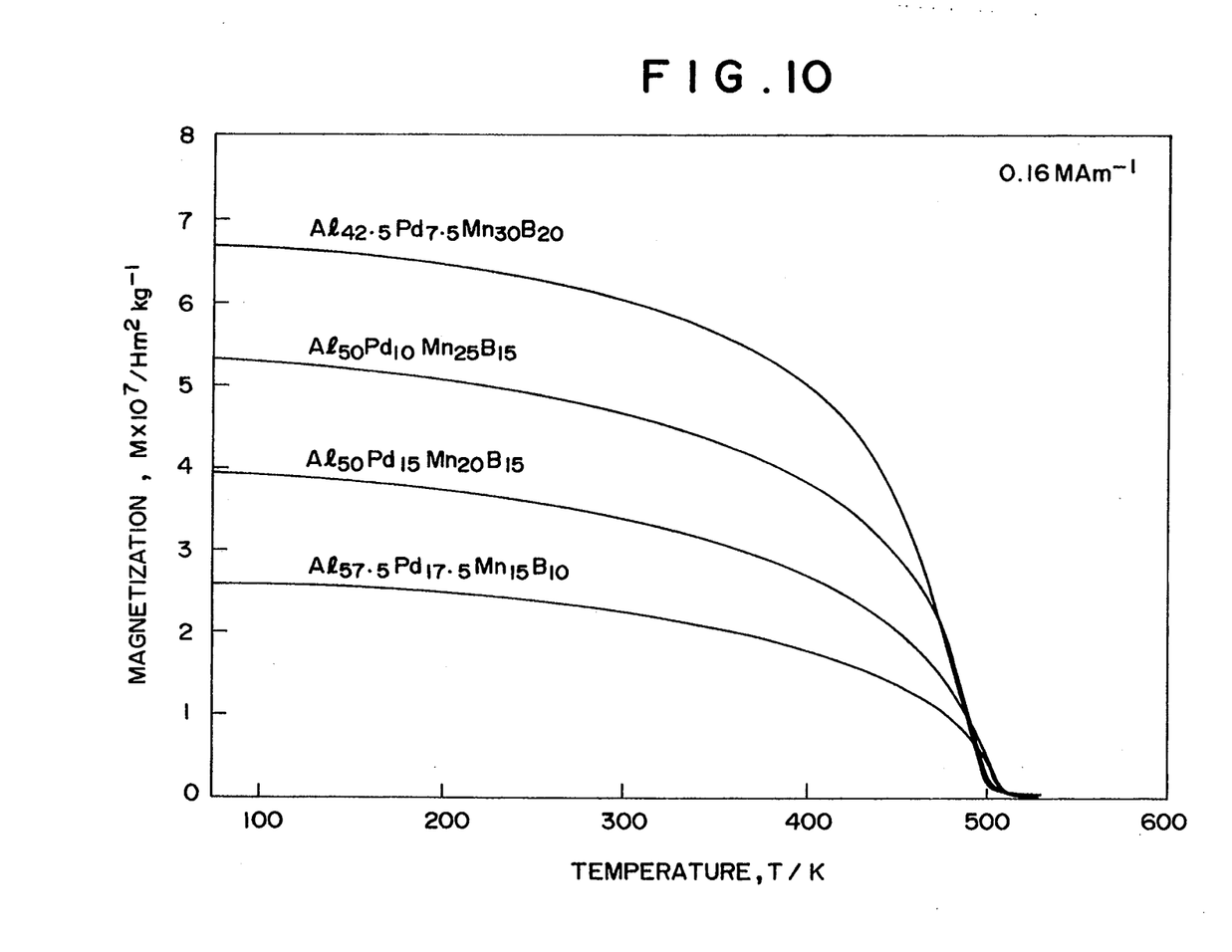
FIG. 10 is a graph showing the temperature dependency of the magnetization.

FIG. 10 is a graph showing the temperature dependency of the magnetization in a magnetic field of 0.16 MA/m of four quasicrystals (I phase) of the same kinds as those shown in FIG. 8. As is apparent from the drawing, the magnetization gradually decreases with the temperature rise, and this tendency does not depend upon the alloy (composition) but the temperature alone.

Figure 11:
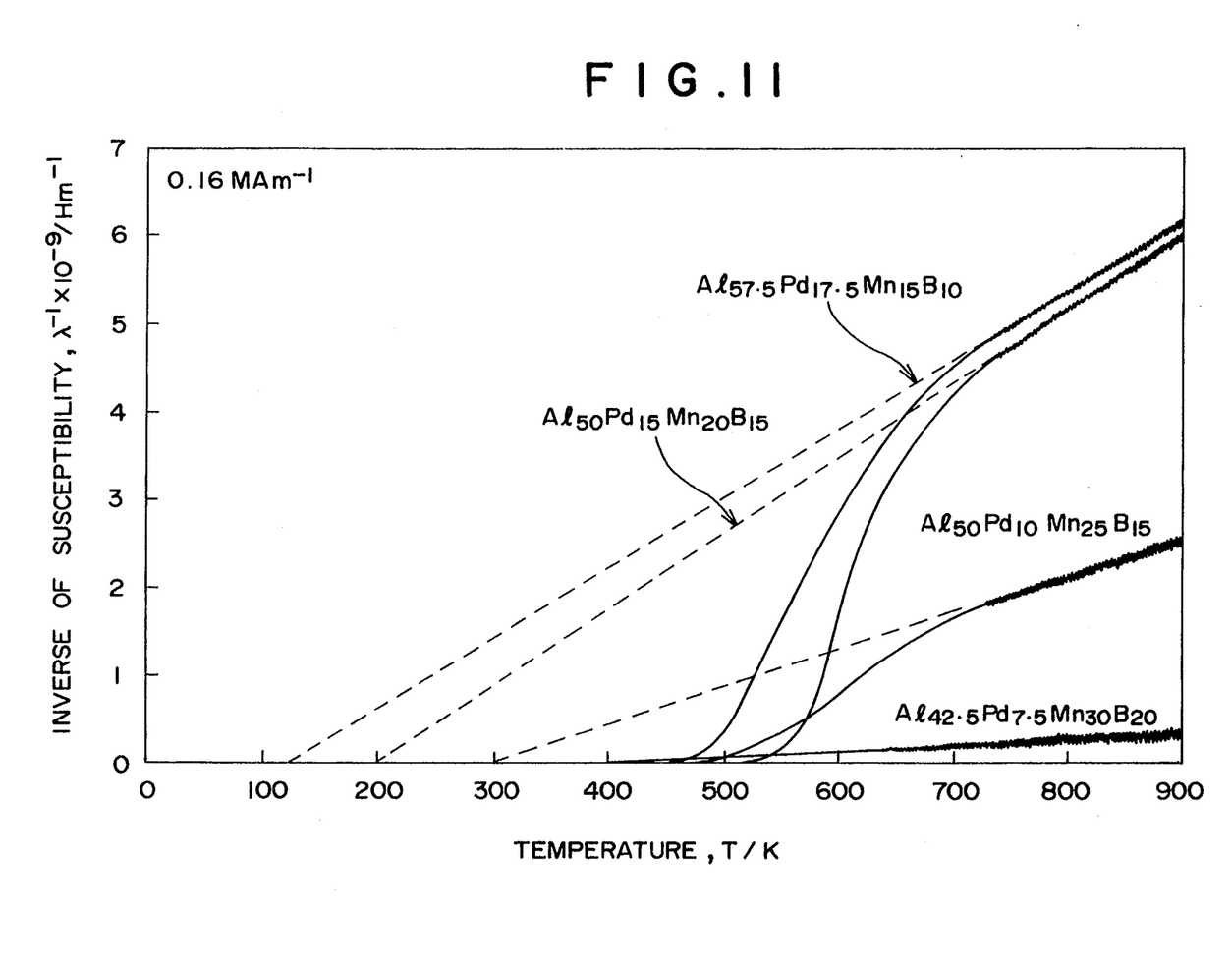
FIG. 11 is a graph showing the inverse of a coercive force at 500K or more.

FIG. 11 is a graph showing the change in the inverse $(1/_{102})$ of the coercive force of these quasicrystals as a function of a temperature of 500 K. or above. As is apparent from FIG. 11, the inverse of the coercive force exponentially increases in a temperature range from 500 to 700 K. and linearly gradually increases at higher temperatures. This is a typical ferrimagnetism. The ferromagnetic Curie temperature ($\Theta f$) and the ferrimagnetic Curie temperature ($\Theta a$) can be determined from this drawing. The results are given in Table 1. The $\Theta f$ value is determined by extrapolating (magnetization: zero) the second power of the intensity of magnetization against the temperature on the lower temperature side, while the $\Theta a$ value is determined by extrapolating (magnetization: zero) the inclination of the straight line part on the low temperature side. As can be seen from Table 1, the increase in the solute concentration causes the $\Theta a$ value to be increased from 130 to 420 K. and the $\Theta f$ value to be decreased from 508 to 473 K.

TABLE 1

| Alloy composition | $\Theta a(K)$ | $\Theta f(K)$ |
| --- | --- | --- |
| $Al_{57.5}Pd_{17.5}Mn_{15}B_{10}$ | 130 ± 40 | 508 |
| $Al_{50}Pd_{15}Mn_{20}B_{15}$ | 190 ± 50 | 507 |
| $Al_{50}Pd_{10}Mn_{25}B_{15}$ | 300 ± 55 | 486 |
| $Al_{42.5}Pd_{7.5}Mn_{30}B_{20}$ | 420 ± 60 | 473 |

This means that the difference between the $\Theta f$ and $\Theta a$ values is decreased from 378 K. to 53 K. with an increase in the magnetization attributable to an increase in the Mn content. This is supposedly because there is a tendency that the magnetic interaction between Mn atoms themselves will be changed from ferrimagnetism to ferromagnetism by decreasing the extent of the antiferromagnetic pairing (decreasing the reverse spin).

Thus, it is apparent that the magnetization of the Al—Pd—Mn—B-based quasicrystal (I phase) obtained by the rapid solidification is caused owing to an enhancement in the magnetic interaction between Mn atoms themselves in the quasicrystals through the addition of B. Moreover, the magnetism is ferrimagnetism which exhibits a ferromagnetic behavior as well.

EXAMPLE 2

Figure 12A:
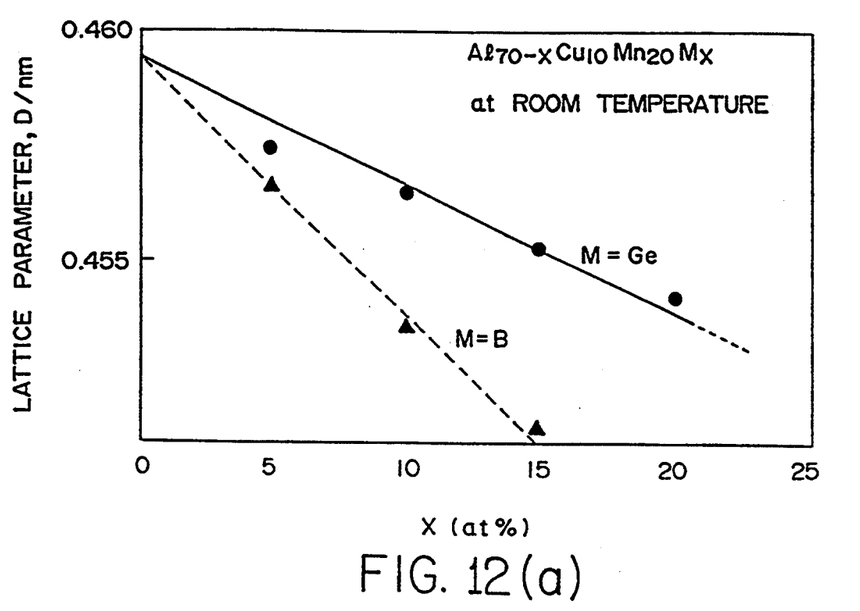
FIG. 12 is a graph showing the changes in the lattice parameter and magnetization of a quasicrystal.
Figure 12B:
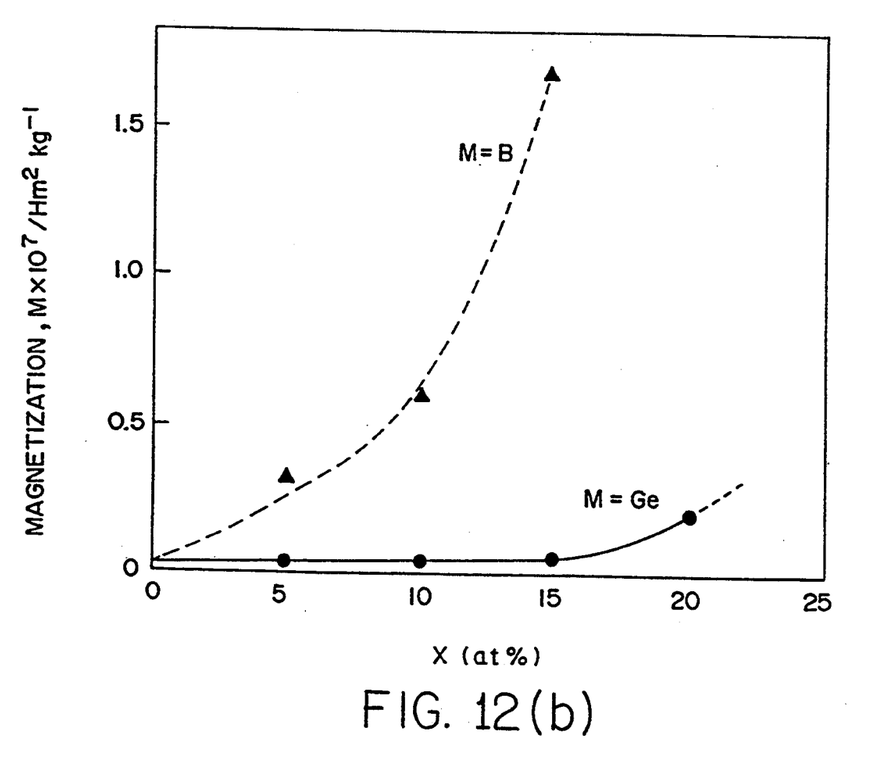

Quasicrystals of an $Al_{70-x}Cu_{10}Mn_{20}B_x$ alloy system were produced in the same manner as that of Example 1 to examine changes in the lattice parameter and magnetization of the quasicrystals as a function of the concentration of B examined. The results are shown in FIG. 12. For comparison, data for an $Al_{70-x}Cu_{10}Mn_{20}Ge_x$ alloy reported by Tsai et al. are also given. The addition of B and Ge causes the lattice parameter of the I phase to be decreased, and this tendency is significant when B is added. The magnetization as well increases with an increasing concentrations of B and Ge. In this case as well, the effect of B is significant. It is apparent that, as with the Al—Pd—Mn-based alloy, in the case of the Al—Cu—Mn-based alloy as well, the addition of B is useful for the development of ferrimagnetism.

Figure 13:
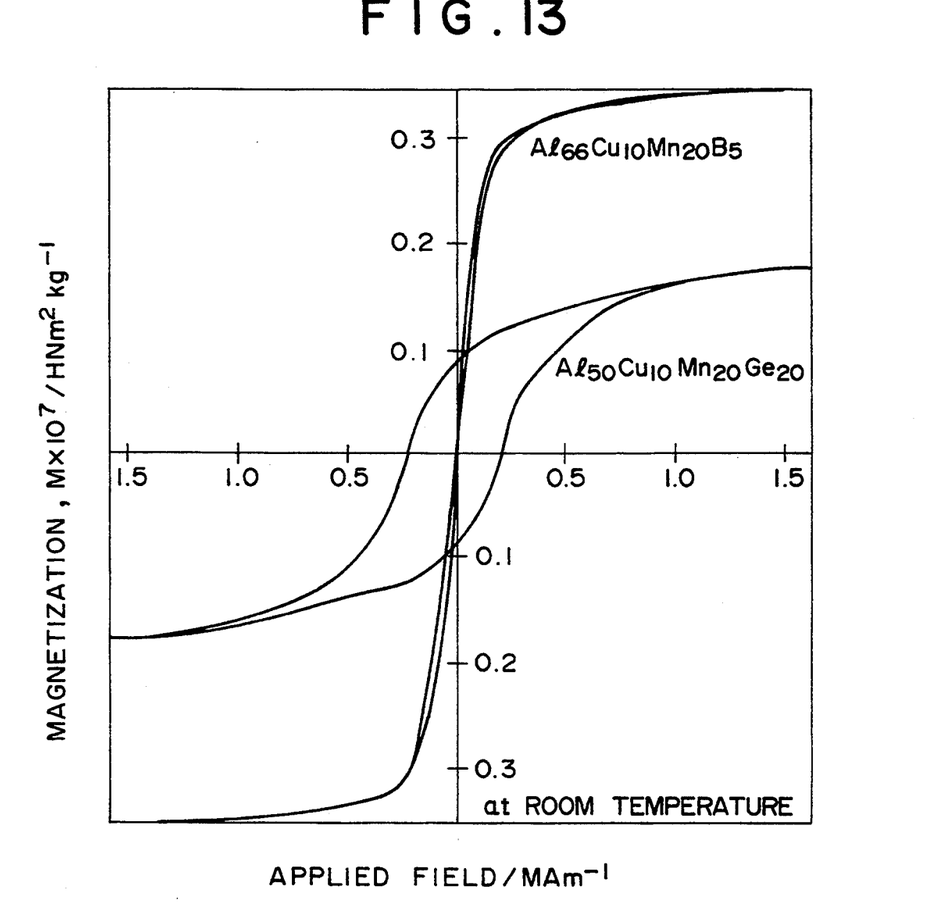
FIG. 13 is a magnetization curve for two alloys.

A magnetization curve (hysteresis) of an $Al_{65}Cu_{10}Mn_{20}B_5$ alloy is shown in FIG. 13 in comparison with a magnetization curve (hysteresis) of an $Al_{50}Cu_{10}Mn_{20}Ge_{20}$ alloy. The alloy containing Ge exhibits a coercive force of 199 kA/m (2.5 kOe) and a residual magnetization of $9.5 \times 10^{-9}$ $Hm^2/kg$, whereas the coercive force and residual magnetization of the alloy containing B are as small as 24 kA/m (0.3 kOe) and $3.2 \times 10^{-9}$ $Hm^2/kg$, respectively. Although the magnetization of the $Al_{65}Cu_{10}Mn_{20}B_5$ alloy is not saturated in a magnetic field of 1.59 MA/m (20 kOe), the application of a small magnetic field causes the magnetization to be rapidly increased and the intensity of magnetization amounts to twice or more that of the alloy containing Ge. It is apparent that the alloy containing B exhibits an excellent soft magnetism.

In the light of the results of the above-described Examples, it is conceivable that the above magnetization behavior is not attributable to such a simple ferrimagnetic interaction that the Mn—Mn interaction in the quasicrystal which exhibits also the ferromagnetic behavior extends over a long range, but a complicate mechanism derived from the introduction of a heterogeneous strain in a short range.

If the mechanism of the development of magnetization is attributable to the RKKY interaction, the magnetization in a local site is supposed to depend upon the strained state of the quasicrystal (I phase) cluster, which leads to the development of the above-described magnetic properties.

As described above, the alloy and process of the present invention exhibits a magnetization capability unattainable in the prior art and, at the same time, a good soft magnetism by adding, to quasicrystals consisting of Al and other elements, and element having a smaller atomic radius than those of Al and other elements constituting the quasicrystals, which enables the intensity of magnetization to be regulated and, at the same time, renders the alloy usable as a magnetic material for various applications, such as magnetic recording heads, by virtue of its light weight, high strength and excellent abrasion resistance derived from the properties characteristic of the alloy of a quasicrystals based on Al.

What is claimed is:

1. A magnetic material consisting essentially of a quasicrystalline phase consisting of Al, 10 to 50 at. % of metal elements capable of alloying with Al to form quasicrystals, said metal elements consisting of 5 to 25 at. % of at least one noble metal element selected from the group consisting of Ni, Cu, Pd, Ag, Pt, and Au and 5 to 35 at. % of at least one transition metal element selected from the group consisting of V, Cr, Mn, Fe, Co, Nb, Mo, Tc, Ru, Rh, Ta, W, Re, Os, and Ir, and more than 0 to 25 at. % of at least one element selected from the group consisting of B and P and having a smaller atomic radius than those of Al and said metal elements, the element having a smaller atomic radius being present in an amount sufficient to effect a magnetic material having a higher magnetization than said magnetic material absent said element.

2. A Magnetic material according to claim 1, wherein said quasicrystals consist of an icosahedral single phase (I phase) or a mixture of an icosahedral phase and a regular decagonal phase (D phase).

3. A magnetic material according to claim 1, wherein the elements capable of alloying with Al to form quasicrystals consist of 5 to 25 at. % of at least one member selected between Cu and Pd and 5 to 35 at. % of Mn.

4. A magnetic material according to claim 1, wherein the element having a smaller atomic radius is B.

* * * * *

UNITED STATES PATENT AND TRADEMARK OFFICE
CERTIFICATE OF CORRECTION

PATENT NO. : 5,397,490
DATED : March 14, 1995
INVENTOR(S) : Tsuyoshi MASUMOTO and Akihisa INOUE It is certified that error appears in the above-identified patent and that said Letters Patent is hereby corrected as shown below:

INVENTORS:

Front Page, line 1, delete "3-8-22,";
line 2, delete "Kamisugi, Aoba-ku"
line 3, delete in its entirety;
line 4, delete "Kawauchi, Aoba-ku," and
line 5, delete "-shi, Miyagi".

Claim 2, column 8, line 28 change "Magnetic" to --magnetic--.

Signed and Sealed this

Twelfth Day of September, 1995

Attest:

BRUCE LEHMAN

Attesting Officer

Commissioner of Patents and Trademarks